S. J. STRID.
HIGH CAPACITY SHOCK ABSORBING MECHANISM.
APPLICATION FILED JULY 25, 1918.
1,308,965.
Patented July 8, 1919.
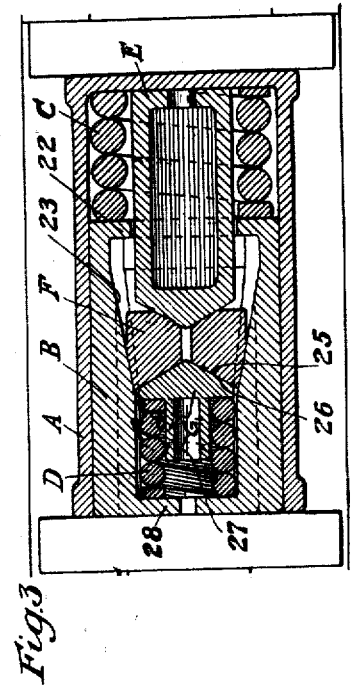
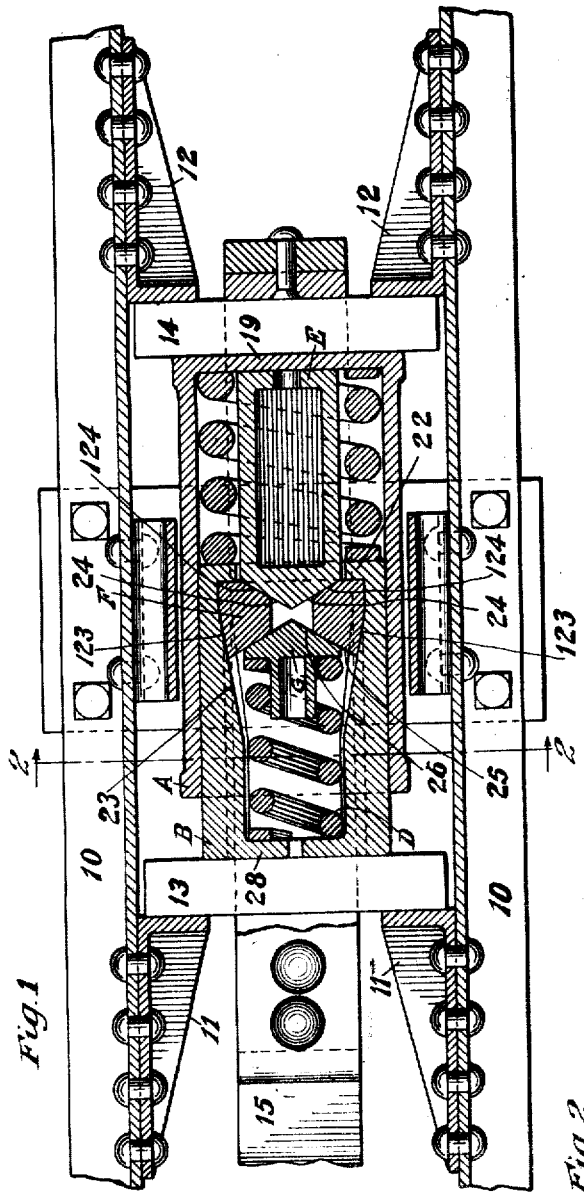
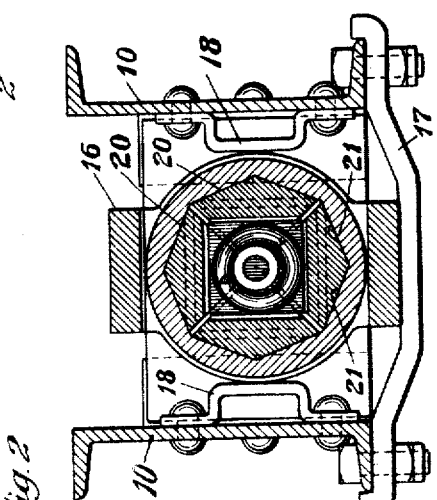
WITNESSES:
Wm Geiger
Meta Schmidt
INVENTOR.
Sven J. Strid
BY George L. Haight
ATTORNEY

UNITED STATES PATENT OFFICE.

SVEN J. STRID, OF CHICAGO HEIGHTS, ILLINOIS, ASSIGNOR TO WILLIAM H. MINER, OF CHAZY, NEW YORK.

HIGH-CAPACITY SHOCK-ABSORBING MECHANISM.

1,308,965.

Specification of Letters Patent.    Patented July 8, 1919.

Application filed July 25, 1918. Serial No. 246,671.

*To all whom it may concern:*

Be it known that I, SVEN J. STRID, a citizen of the United States, residing at Chicago Heights, in the county of Cook and State of Illinois, have invented a certain new and useful Improvement in High - Capacity Shock-Absorbing Mechanism, of which the following is a full, clear, concise, and exact description, reference being had to the accompanying drawings, forming a part of this specification.

This invention relates to improvements in high capacity shock absorbing mechanism.

One object of this invention is to provide a high capacity friction shock absorbing mechanism, especially adapted for railway draft riggings.

More specifically, one object of the invention is to provide a friction shock absorbing mechanism embodying friction shoes, wedge elements and spring means so arranged that the friction shoes are directly resisted in their movement by one spring means and a frictional wedge action induced by an independent spring means.

In the drawings forming a part of this specification, Figure 1 is a longitudinal, sectional view of a portion of a railway draft rigging, showing my improvements in connection therewith. Fig. 2 is a vertical, transverse, sectional view taken on the line 2—2 of Fig. 1. And Fig. 3 is a view similar to Fig. 1 showing the position assumed by the parts under full compression.

In said drawings, 10—10 denote channel-shaped draft sills of a railway car, to the inner faces of which are secured front lugs 11 and rear lugs 12 with which coöperate front follower 13 and rear follower 14, respectively. The draw bar of the draft rigging is indicated at 15 and is operatively associated with the shock absorbing mechanism proper by a suitable yoke 16 and all parts are supported by a detachable saddle plate 17.

The improved shock absorbing mechanism, as shown, is interposed between the followers and comprises, broadly, a friction shell A, a series of friction shoes B, spring C, a second spring D, a post E, wedge elements F and follower G. The shell and its associated parts are centered by means of suitable guide plates 18—18 on the inner faces of the sills.

The shell A is in the form of a casting of substantially cylindrical exterior form and has a friction shell proper at its forward end, an integral spring casing at its rear end and integral rear wall 19. On its inner side, the shell A is provided with a series of plain friction faces 20—20 arranged in the form of an octagon, as clearly shown in Fig. 2.

Each of the friction shoes B is formed on its outer side with a pair of friction surfaces 21—21 disposed at such an angle that the surfaces 21 will coöperate with two adjacent surfaces 20 of the shell. At its inner end, each shoe B is formed with an inturned flange, as indicated at 22, to engage the forward end of the spring C which is interposed between the ends of the shoes B and the rear wall 19 of the shell A. Each shoe B is further provided on its inner side with an inclined wedging surface or face 23 beginning near the inner end of the shoe and with which coöperate the wedge members F, one for each shoe, as clearly indicated in the drawing.

The post E is shown as a hollow casting detachable with respect to the friction shell A. At its forward end, the post E is provided with a series of wedge surfaces 24—24 corresponding in number to the number of friction shoes. The wedge members F are provided on their ends with corresponding wedge surfaces 124—124 coöperable with the post. On their outer sides, the wedge members F are formed with wedge faces 123—123 coöperable with the corresponding wedge faces 23 of the friction shoes. On their forward ends, the wedge members F are formed with additional wedge faces 25 that engage a correspondingly formed wedge face 26 on spring follower G, said follower G having a hollow stud 27 on which is positioned the spring D. At their forward ends, the shoes B are provided with inturned flanges 28 against which bears the spring D, the construction and arrangement of the shoes B leaving a chamber centrally thereof within which are mounted the spring D, follower G, and wedge members F.

Assuming the parts in normal or full release position as shown in Fig. 1, inward movement of the draw bar will force the shoes B lengthwise of the shell A. In this movement, the shoes B are directly resisted by the spring C without any tendency of the latter to affect the friction between the shoes B and shell A. As the shoes B move inwardly, as above described, it is evident that the spring D will also be simultaneously compressed from its left hand end as viewed in Fig. 1. Furthermore, inward movement of the shoes B forces the wedge members F inwardly toward the center line of the gear as the inclined faces 23 of the shoes slide over the corresponding faces 123 of the members F. Not only will the members F be forced inwardly or laterally but, on account of the wedge-shaped end of the post E, will be forced forwardly and this movement in turn is transmitted to the follower G so that the spring D is also compressed from its inner end. In this manner, the spring mounted within the shoes is utilized to create the radial or lateral pressure from the shoes to the shell. In release, it will be seen that both springs C and D act in unison to throw the shoes outwardly which is of importance in insuring certain release of the parts.

From the preceding description, it will be seen that the shock absorbing mechanism is of high capacity, unusually compact and so designed as to insure certain release.

I claim:

1. In a friction shock absorbing mechanism, the combination with a friction shell, of a plurality of friction shoes slidable longitudinally of said shell, tandem arranged springs, one of said springs having its outer end directly engaged by said shoes at their rear ends and the other of said springs having its outer end directly engaged by the front ends of said shoes, lateral pressure-creating means coacting with said shoes and including an element stationary with respect to the shell and elements disposed within and engaging the interior faces of said shoes, said spring that is engaged by the front ends of said shoes having its inner end engaging also one of said elements within the shoes.

2. In a friction shock absorbing mechanism, the combination with a friction shell, of a post disposed within the shell, friction shoes cooperable with and movable lengthwise relatively to the shell, a spring located between the outer ends of said shoes and said post, and friction-creating means interposed between the adjacent end of said spring and post.

3. In a friction shock absorbing mechanism, the combination with a friction shell having a centrally disposed post therein, of a plurality of friction shoes movable lengthwise of said shell and arranged so as to leave a chamber centrally thereof, said shoes being provided with wedge faces on their inner sides, a spring surrounding said post and engaging the inner ends of said shoes, a plurality of wedge-acting members within said shoes and cooperable with the adjacent end of the post and the wedge faces of the shoes, a spring follower cooperable with said wedge members, and a spring interposed between said spring follower and the friction shoes.

4. In a friction shock absorbing mechanism, the combination with a friction shell, of tandem arranged springs one located forwardly of the other, friction shoes cooperable with said shell, each of said shoes engaging the forward ends of both of said springs and adapted to compress the latter in the same direction upon relative movement of the shoes and shell, and means for forcing said shoes into frictional engagement with the shell, said means preventing the inner end of the forward spring from moving inwardly of the shell when the shoes move inwardly relatively thereto.

5. In a friction shock absorbing mechanism, the combination with a friction shell, of tandem springs one disposed forwardly of the other, friction shoes cooperable with said shell, each of said shoes engaging the forward ends of both springs, and means for forcing said shoes into frictional engagement with the shell, said means including an element stationary with respect to the shell during relative movement of the shell and shoes.

6. In a friction shock absorbing mechanism, the combination with a friction shell, of tandem arranged springs one located forwardly of the other, friction shoes cooperable with said shell, each of said shoes engaging the forward ends of both springs, and friction wedge elements cooperable with said shoes for forcing the latter into frictional engagement with the shell, one of said elements being movable forwardly and engaging the inner end of said forward spring, whereby the latter is compressed from both ends simultaneously when the shoes are moved inwardly relatively to the shell.

7. In a friction shock absorbing mechanism, the combination with a friction shell, of a plurality of friction shoes cooperable with said shell and slidable relatively thereto, said shoes when assembled within the shell forming a chamber on their interior, a spring disposed within said chamber, said shoes having direct engagement with one end of said spring, and means, including elements within and movable relatively to said shoes, acting on the opposite end of said spring, said spring being compressed simultaneously from both ends upon movement of the shoes relatively to the shell.

8. In a friction shock absorbing mechanism, the combination with a friction shell, of a plurality of friction shoes disposed within said shell and having a chamber formed on their interior when the shoes are assembled within the shell, a spring disposed within said chamber, said shoes having direct engagement with one end of said spring, and devices, including means stationary with respect to the shell and elements within the shoes coöperable therewith, acting on the opposite end of said spring, the latter being compressed simultaneously from both ends upon actuation of the shoes relatively to the shell.

9. In a friction shock absorbing mechanism, the combination with a friction shell, of a plurality of friction shoes coöperable with said shell and slidable relatively thereto, said shoes when assembled within the shell forming a chamber on their interior, a spring disposed within said chamber, said shoes having direct engagement with one end of said spring, and means, including elements within and movable relatively to said shoes, acting on the opposite end of said spring, said spring being compressed simultaneously from both ends upon movement of the shoes relatively to the shell, and a second spring within the shell also engaged by said shoes at one of its ends and having its other end bearing against the shell.

10. In a friction shock absorbing mechanism, the combination with a friction shell, of a plurality of friction shoes mounted therein, said shoes forming an interior chamber when assembled, said shoes having interior wedge faces tapered inwardly toward the outer ends of said shoes, wedges coöperable with said wedge faces of the shoes, a wedge follower within said chamber and coöperable with said wedges, a spring within the chamber having its inner end engaged by said wedge follower, and means stationary with respect to the shell and coöperable with said wedges adapted, in conjunction with the shoes upon inward movement of the latter relatively to the shell, to force said wedge follower forwardly and thereby move the inner end of the spring in a direction opposite to the direction of movement of the shoes.

In witness that I claim the foregoing I have hereunto subscribed my name this 6th day of July, 1918.

SVEN J. STRID.

Witnesses:
JOSEPH HARRIS,
META SCHMIDT.